UNITED STATES PATENT OFFICE.

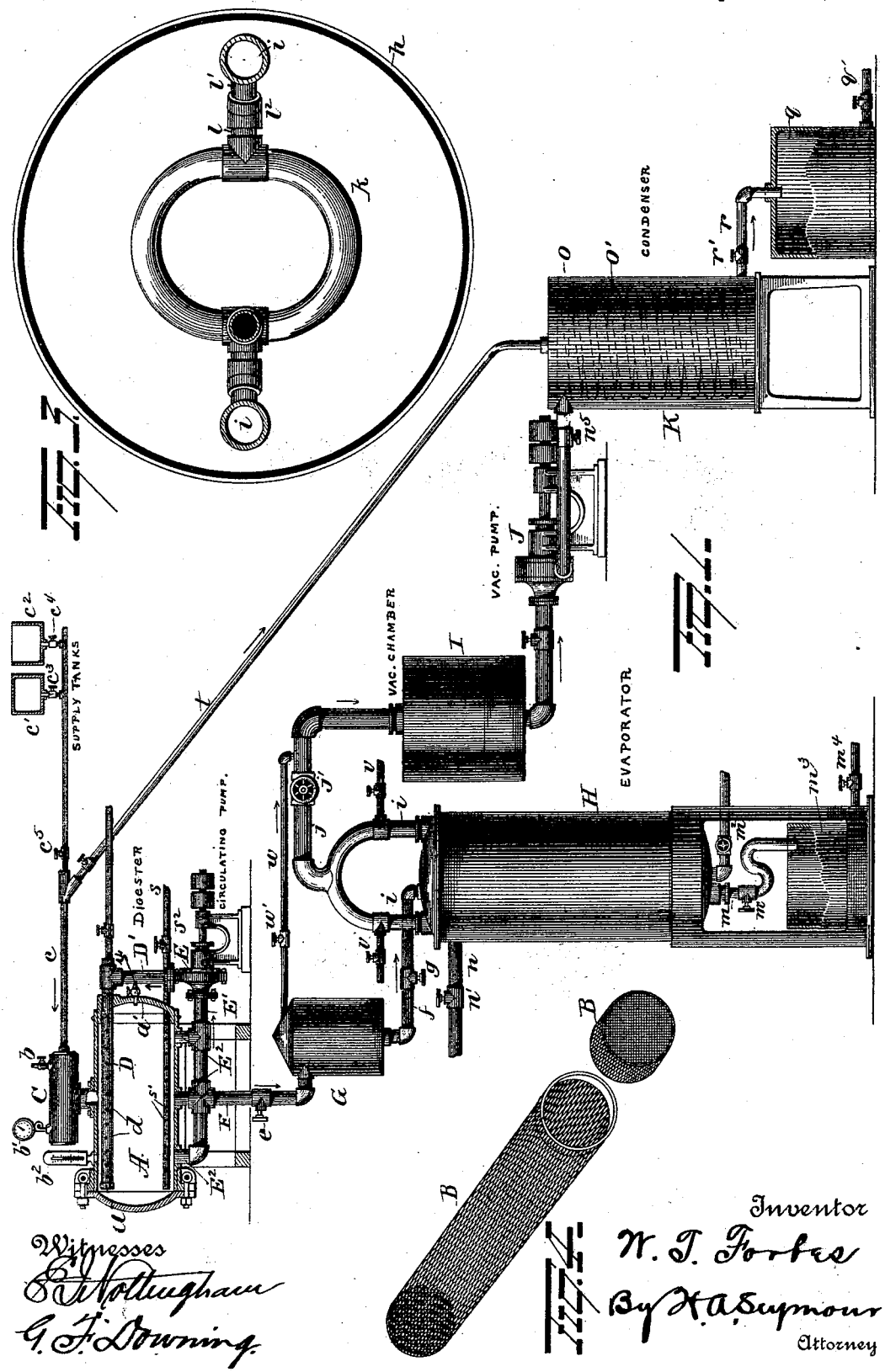

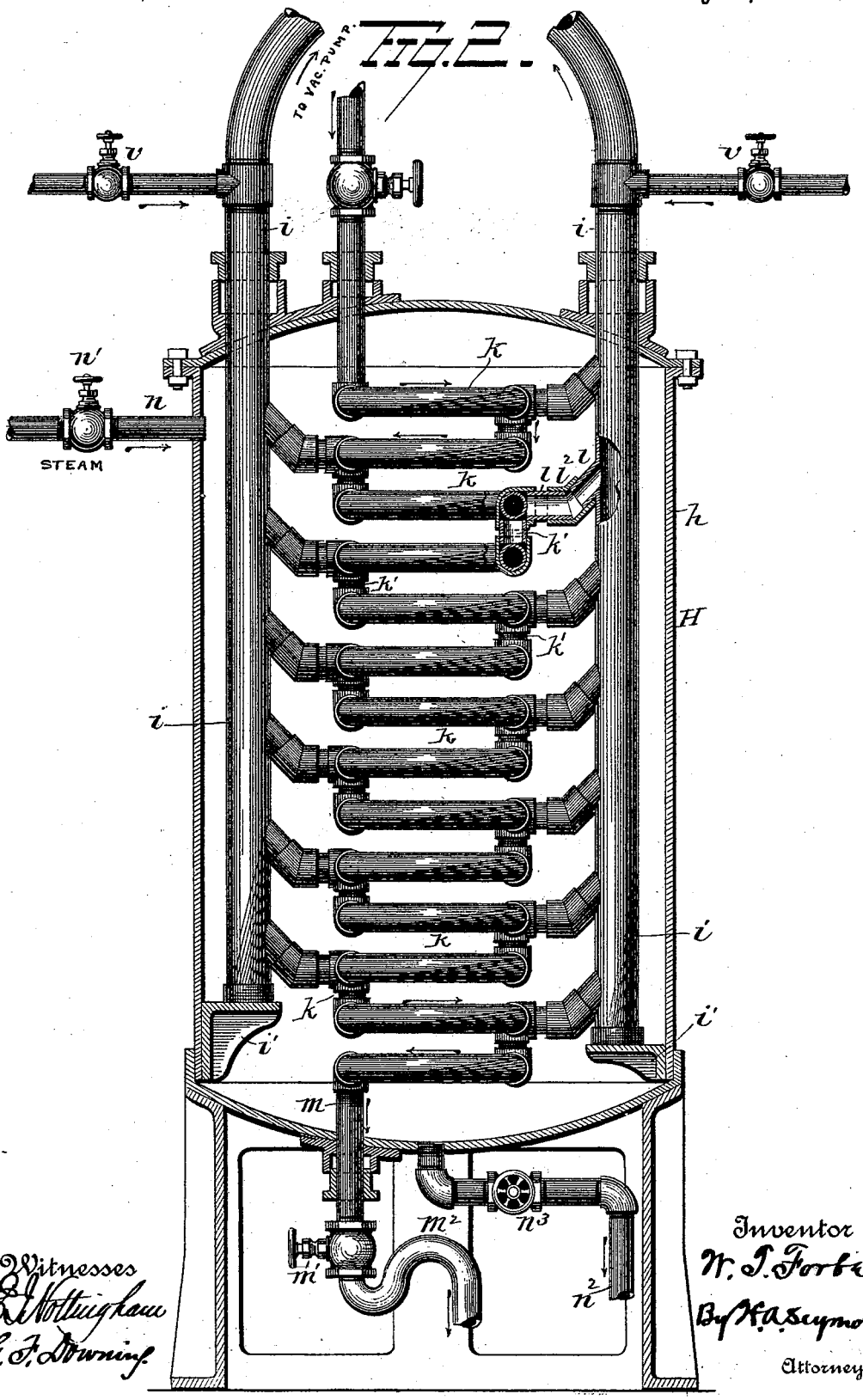

WALTER T. FORBES, OF ATLANTA, GEORGIA.

APPARATUS FOR EXTRACTING OIL FROM COTTON-SEED.

SPECIFICATION forming part of Letters Patent No. 519,424, dated May 8, 1894.

Application filed November 16, 1893. Serial No. 491,122. (No model.)

*To all whom it may concern:*

Be it known that I, WALTER T. FORBES, a resident of Atlanta, in the county of Fulton and State of Georgia, have invented certain new and useful Improvements in Processes of and Apparatus for Extracting Oil from Cotton-Seed; and I do hereby declare the following to be a full, clear, and exact description of the invention, such as will enable others skilled in the art to which it appertains to make and use the same.

My invention relates to an improvement in apparatus for extracting oil from seed,—the object of the invention being to produce means whereby the oil contained in cotton seed can be readily and quickly extracted therefrom.

A further object is to provide efficient means for extracting oil from seed by means of a solvent and separating said solvent from the oil.

A further object is to produce a simple and efficient apparatus by means of which oil may be separated from cotton seed and saccharine matter from sugar cane.

In the accompanying drawings: Figure 1 is a view illustrating my improvements. Figs. 2, 3 and 4 are detail views.

A represents a cylinder or digester preferably of a size adapted to accommodate a large quantity of cotton seed, which latter will be placed in baskets B, each holding preferably about one hundred pounds, and said baskets, containing the cotton seed, will be placed in the cylinder, through one end thereof. For this purpose the cylinder is provided at one end with a door $a$ adapted to be tightly closed, the other end of the cylinder being closed by a permanent head $a'$. The baskets B will preferably be made of wire netting and cylindrical in form, each basket having an opening at one end which will be closed by a cap B'.

A dome C is located above the cylinder A and communicates therewith, said dome being provided with a cock $b$ and a gage $b'$ and on the cylinder, a thermometer $b^2$ is located. A pipe $c$ communicates at one end with the dome C and at the other end with vats $c'$, $c^2$, the vat $c'$ being closed and adapted to contain naphtha and the vat $c^2$ being intended to contain water. The flow of the fluid from the vats $c'$, $c^2$ into the pipe $c$ will be controlled by means of valves $c^3$, $c^4$ and the flow of fluid from the pipe $c$ into the dome C will be controlled by a valve $c^5$.

A pipe D having perforations $d$ is located in the upper portion of the cylinder A and extends from end to end thereof, one end of said pipe being closed. A pipe D' communicates at one end with the pipe D and at the other end with a circulating pump E. A pipe E' also communicates with the pump E and said pipe E' is connected with the bottom of the cylinder A by means of a series of, preferably three, pipes $E^2$. The baskets of cotton seed having been placed in the cylinder or digester A, as above explained, naphtha will be permitted to flow into the cylinder A from the vat $c'$ by operating the valves $c^3$, $c^5$, until said cylinder becomes filled, after which said valves will be closed. The valve $e$ in a pipe F communicating with the pipe E' will also be closed and then the circulating pump E will be started; the action of which will cause a rapid circulation of naphtha through the cotton seed in the cylinder A, the naphtha, and oil dissolved by it, leaving the cylinder through the pipes $E^2$ and flowing into the pipe E',—from which it will flow through the pump E and pipe D' into the pipe D, from which latter it will escape through the perforations $d$ and become distributed on the seed in the cylinder A. This circulation of the fluid will be continued until all the oil in the seed shall have been dissolved or extracted, when the pump E will be stopped, the valve $e$ in the pipe F opened, and the combined oil and naphtha will be permitted to escape through the pipe F into a receiving tank G located below the cylinder A, the air having first been exhausted from said tank as hereinafter explained. A pipe $f$ having a valve $g$ communicates at one end with the receiving tank G and at the other end with a separator or evaporator H located below said receiving tank. In constructing the separator or evaporator H, a vertical, cylindrical shell $h$ is employed, in which, at diametrically opposite points, vertical pipes $i$, $i$, are located, said pipes resting on shelves $i'$ located at the bottom of the cylinder or shell $h$. The lower ends of the pipes $i$ are closed and their upper ends project through the top of the cylinder or shell and both communicate with a pipe $j$ having a valve $j'$. Located within the cylinder or shell $h$ is a series of annular pipes $k$ connected together alternately at diametrically opposite points by short pipe sections $k'$. At the upper end of each joint thus formed, the annular pipes $k$ are connected alternately with the pipes $i, i$, by means of pipes $l, l'$ and couplings $l^2$. A pipe $m$ communicates with the bottom annular pipe $k$ and is provided with a valve $m'$, said pipe terminating in a goose-neck $m^2$ located under the cylinder or shell $h$ and the goose neck is adapted to discharge into a tank $m^3$ provided at its bottom with a valve $m^4$. By providing the goose-neck in the outlet pipe $m$, liquid will be retained therein so that no air will be permitted to enter the annular pipes $k$. A pipe $n$ having a valve $n'$ communicates with the shell or cylinder H in proximity to its upper end for the admission of steam whereby to heat the pipes in said cylinder or shell and at the lower end a pipe $n^2$ communicates with said cylinder or shell for the exhaust of steam therefrom, said pipe $n^2$ being provided with a valve $n^3$. The pipe $j$, to which the pipes $i$ are connected, communicates with a vacuum chamber I and the latter communicates with a vacuum pump J. The vacuum pump communicates with a condenser K, by means of a pipe $n^4$ having a valve $n^5$,—which condenser comprises a cylinder $o$ adapted to contain water and a coil of pipe $o'$, which is connected with the pipe $n^4$. The lower end of the coil $o'$ extends through the cylinder $o$ and is connected with a pipe $r$ having a valve $r'$ said pipe communicating with a closed tank $q$ having a valved outlet $q'$. A pipe $w$ communicates at one end with the upper end of the receiving tank G and at the other end with the pipe $j$ to the right of the valve $j'$, said pipe $w$ being provided with a valve $w'$. By closing the valve $j'$ and opening the valve $w'$, the vacuum pump can be operated to exhaust the air from the receiving tank G.

The cylinder A having been charged with cotton seed and the oil extracted from the seed by means of naphtha made to rapidly circulate through it in the manner above explained, the oil and naphtha will be permitted to enter the receiving tank G. The air having been exhausted from said receiving tank, the oil and naphtha will flow rapidly into the same from the cylinder or digester A. By thus enhancing the outflow of oil and naphtha from the cylinder or digester by means of suction, said oil and naphtha will be almost entirely removed from the residuum. From the tank G, the naphtha and oil will be permitted to pass to the separator or exhauster H. As the mixture passes through the first annular pipe $k$, a portion of the naphtha contained in it will be evaporated and will pass into one of the vertical pipes $i$, while the oil will pass into the next annular pipe, where more of the naphtha will be separated therefrom, and so on to the last annular pipe. After passing through the last annular pipe $k$, the oil will pass through the pipe $m$, drop by drop, and discharge into the tank $m^3$, entirely free from naphtha. The naphtha which was evaporated in its passage through the annular pipes and which entered the vertical pipes $i$, will pass into the vacuum chamber I, being drawn therein by the vacuum pump J, from which chamber it will be made to pass, by the vacuum pump, into the condenser, where it will be condensed and pass into the closed tank $q$. Valved steam pipes $v$ are made to communicate with the pipes $i$ whereby to admit steam into said pipes for cleansing the same. A pipe $s$ having perforations $s'$ passes through one end of the cylinder A in proximity to the bottom thereof and extends to the opposite end of said cylinder. The pipe $s$ is intended to convey steam into the cylinder A for a purpose presently explained, and is provided with a valve $s^2$, whereby to control the steam supply. A pipe $t$ communicates at one end with the pipe $c$ between the dome C and the valve $c^5$, the other end of said pipe $t$ being made to communicate with the coil $o'$ of the condenser K. After the oil shall have been removed from the seed by the process above described, the valve $e$ in pipe F will be closed and the valve $s^2$ in the pipe $s$ will be opened. Steam will now enter the pipe $s$ and, escaping through the perforations $s'$ in said pipe $s$, will impregnate the exhausted pulp or residuum in the cylinder A and escape through the dome C into the pipe $c$ carrying with it, naphtha which may remain in the pulp or residuum. From the pipe $c$ the steam and naphtha will pass through the pipe $t$ and by it be conveyed to the condenser K by which it will be condensed and flow into the tank $q$. Thus the pulp or residuum will be entirely freed from naphtha and none of the latter will be lost. The cylinder A is preferably provided with a cock $u$ by means of which the operator can ascertain whether or not the pulp or residuum has been entirely freed from naphtha.

It will be seen that by my improved apparatus the oil will be effectually removed from the seed; that when it reaches the tank $m^3$ it will contain no naphtha and that the naphtha employed will be effectually recovered and can be again used in carrying out the process with a fresh supply of seed. With processes for extracting oil from seed by means of naphtha, thirty hours are required to extract the oil from thirty tons of seed, and twelve hours are necessary to free the pulp or residuum from naphtha. By dividing the material into lots of one hundred pounds each and subjecting it to the process above set forth, the entire process can be completed in six hours.

My improved apparatus is also well suited and efficient for recovering saccharine matter from sugar cane. When the apparatus is used for this purpose, the cane, after having been broken or chipped, will be placed in baskets and the latter will be inserted into the cylinder A in the same manner as above described. Water will then be allowed to pass into and fill the cylinder from the tank or vat $c^2$. The valve $e$ in the pipe F is closed and then the steam is admitted into the pipe D, through a pipe $D^3$. The circulating pump E will then be started and the water, heated by the steam entering through the pipes D, $D^3$, will be made to circulate through the cane in the cylinder A, in the same manner as the naphtha was circulated in extracting oil from seed as above explained. After this circulation of water has continued a sufficient length of time to dissolve the saccharine matter contained in the cane, the pump will be stopped and the water and saccharine matter will be permitted to escape from the cylinder through the pipe F into the receiving tank G, from which it will pass through the separator or evaporator, where a large portion of the water will be separated from it, the sirup finding its way to the tank $m^3$ and the evaporated water or steam passing through the vacuum chamber, vacuum pump and finally through the condenser, where it will be condensed.

Having fully described my invention, what I claim as new, and desire to secure by Letters Patent, is—

1. The combination with a cylinder or digester, of means for causing a circulation of fluid through said digester, a tank communicating with said cylinder or digester, a separator or evaporator communicating with said tank, a vacuum chamber communicating with said separator or evaporator, a vacuum pump communicating with said vacuum chamber and a condenser communicating with said vacuum pump, substantially as set forth.

2. The combination with a cylinder or digester adapted to receive the material to be treated, a pipe for conveying naphtha or other solvent into the cylinder or digester, and a valve in said pipe, of a condenser, a pipe leading from the naphtha or solvent conducting pipe at a point between the valve and the cylinder or digester, to the condenser, and a steam pipe discharging into the cylinder or digester, substantially as set forth.

3. The combination with a cylinder or digester adapted to receive the material to be treated, means for creating a circulation within the cylinder or digester, of a pipe for conducting naphtha or other solvent from a suitable supply tank into the cylinder or digester, a valve in said pipe, a condenser, a pipe leading from the naphtha pipe at a point between the cylinder or digester and the valve therein, to the condenser, and a pipe for conducting steam into the cylinder or digester, substantially as set forth.

4. The combination with a cylinder or digester, means for supplying the contents thereof with naphtha or other solvent, and for creating a circulation therein, of a tank, a pipe leading from the cylinder or digester into the tank, a pipe for the discharge of the contents of the tank, and a pump having communication with the upper portion of the tank for withdrawing air therefrom, substantially as set forth.

5. The combination with a cylinder or digester, means for creating a circulation of its contents, and a tank into which its contents are discharged, of a separator or evaporator into which the contents of the tank are discharged, a vacuum pump, a pipe leading out of the separator or evaporator in communication with the pump, a pipe leading from the tank into said pipe, and valves in both of said pipes, substantially as set forth.

In testimony whereof I have signed this specification in the presence of two subscribing witnesses.

WALTER T. FORBES.

Witnesses:
JOSEPH H. BRICE,
BERNARD McCARTHY.